Nov. 24, 1925.  
H. C. MAUL  
1,562,840  
DRAFT EQUALIZER AND DIFFUSER  
Filed May 11, 1925   2 Sheets-Sheet 2

Inventor  
Henry C. Maul,  
By  
Attorney

Patented Nov. 24, 1925.

1,562,840

UNITED STATES PATENT OFFICE.

HENRY C. MAUL, OF DETROIT, MICHIGAN, ASSIGNOR TO THE MICHIGAN STOVE COMPANY, OF DETROIT, MICHIGAN, A CORPORATION OF MICHIGAN.

DRAFT EQUALIZER AND DIFFUSER.

Application filed May 11, 1925. Serial No. 29,355.

*To all whom it may concern:*

Be it known that I, HENRY C. MAUL, a citizen of the United States, residing at Detroit, in the county of Wayne and State of Michigan, have invented certain new and useful Improvements in Draft Equalizers and Diffusers, of which the following is a specification, reference being had therein to the accompanying drawings.

In the art of heaters, there are many furnaces, stoves, and combustion chambers provided with side exhaust flues which produce a draft for carrying off smoke, spent products of combustion and gases. On account of the exhaust flue being at one side of a chamber, the products of combustion are drawn towards such side of the chamber, resulting in a "hot spot" or one side wall of the chamber being more intensely heated than the other side walls. Such an unusual distribution of heat not only results in a burning wear of one portion of the chamber, but waste of heat. To prevent the waste of heat, various forms of baffle members have been placed in combustion chambers, and in every instance of a baffle member between a source of heat and a side exhaust flue I have found a direct draft to the flue and heating of one side of a chamber more than another.

To rectify this condition, I have constructed and successfully used a draft equalizer or heat diffuser that is self cleaning; ideal for soft coal; affords a maximum radiation, and contributes to a perfect combustion of fuel.

The diffuser cooperates with a furnace or heater structure in providing a plurality of flues at the walls of the heater or furnace and the configuration of the diffuser insures an equal draft in each flue so that the walls of all of the flues are evenly heated. The diffuser constitutes a new article of manufacture applicable to various types of furnaces, and this construction and arrangement in a furnace will be hereinafter described and then claimed.

Reference will now be had to the drawings, wherein

Figure 1:
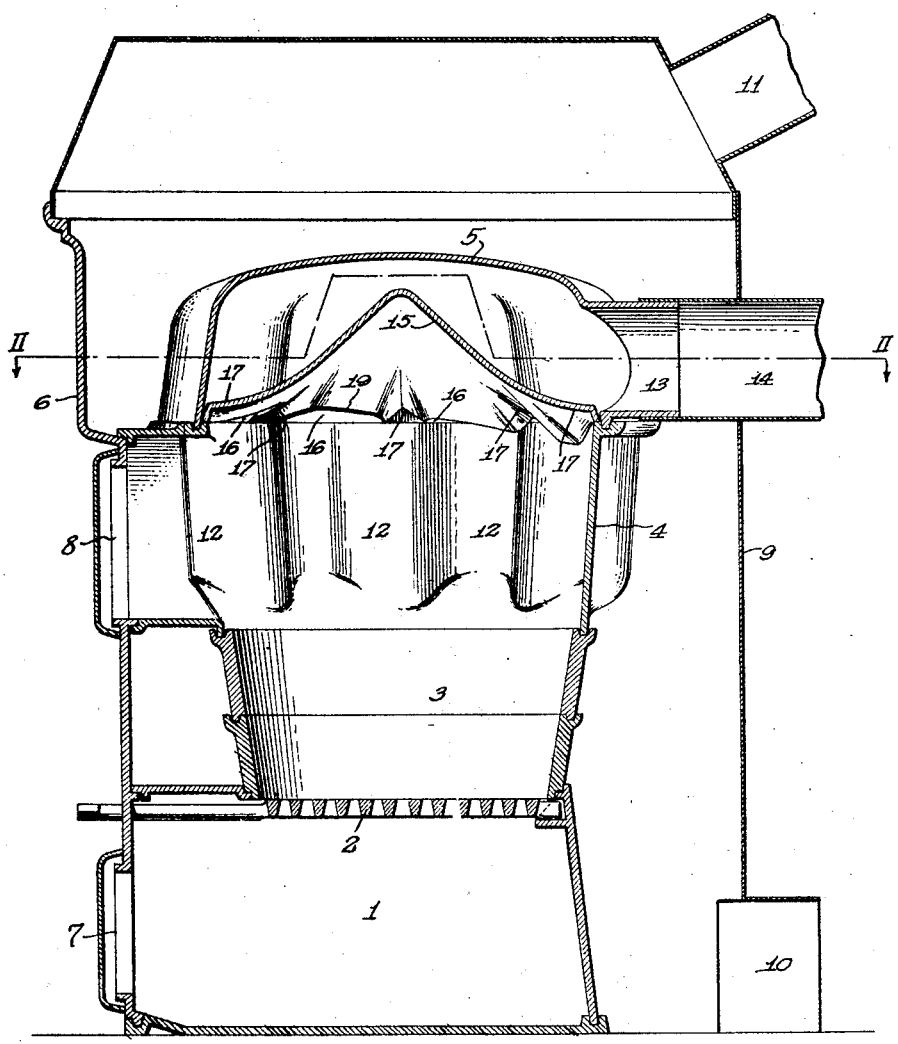
Figure 1 is a vertical sectional view of the furnace provided with a diffuser in accordance with my invention.

In the drawings there is illustrated a well known type of furnace which includes an ash pit 1, a grate 2, a fire box 3, a combustion chamber 4, a dome 5, a front wall 6, doors and doorways 7 and 8, and a casing 9 provided with a cold air inlet flue 10 and one or more hot air outlet flues 11. The combustion chamber 4 and the dome 5 are of the fluted or flue type, that is, the side walls of the combustion chamber and dome are scalloped or fluted to form a plurality of circumferentially disposed vertical flues 12, and at the rear side of the dome 5 is an outlet connection 13 for the exhaust pipe 14.

Before describing my draft equalizer and diffuser in connection with this type of furnace, I desire to direct attention to the fact that when a fire is maintained in the fire box 3 of the old form of furnace the draft is directed to the connection 13 with the result that the rear part of the combustion chamber 4 will be more intensely heated than the front part thereof. It is to prevent this that I have invented a structure to set on the upper edges of the combustion chamber 4 and extend into the dome 5 to distribute the draft to all of the flues 12 with the draft uniform in said flues so that all of the walls of the combustion chamber 4 and the dome 5 may be evenly or uniformly heated.

Figure 2:
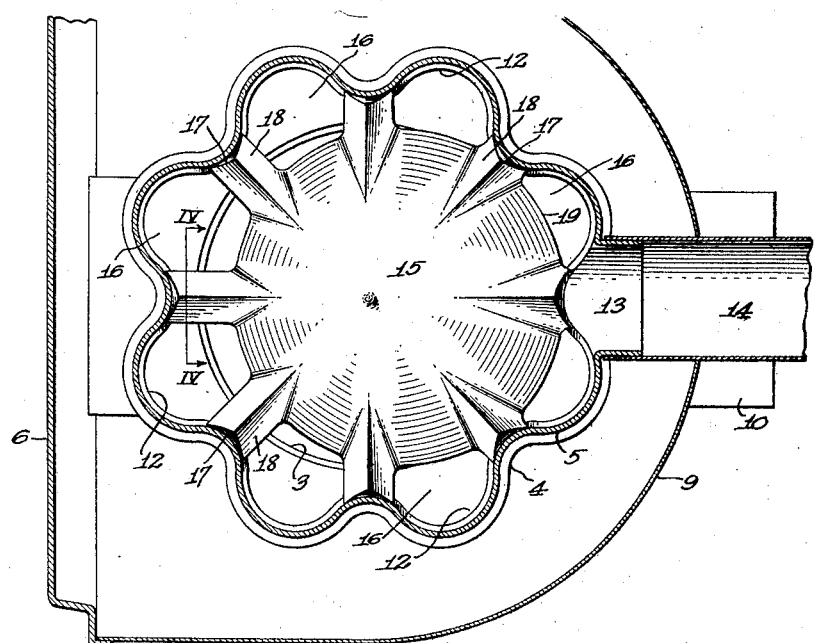
Fig. 2 is a horizontal sectional view taken on the line II—II of Fig. 1.
Figure 3:
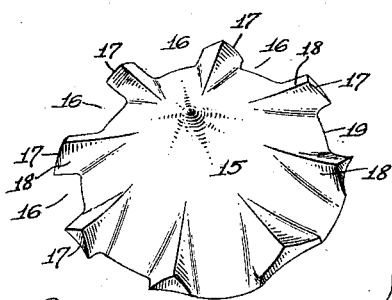
Fig. 3 is a perspective view of the diffuser on a small scale.
Figure 4:
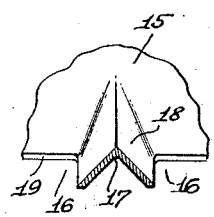
Fig. 4 is a cross sectional view taken on the line IV—IV of Fig. 2.

The draft equalizer and diffuser comprises a conical shaped member 15 having its apex in the axis of the combustion chamber 4 and its walls sloping downwardly and outwardly towards the flues 12 so that any soot deposited on the walls of the member will be directed into the flues and the fire box of the furnace. The marginal edges of the member 15 are cut away to provide openings 16 and the formation of these openings provides radially disposed supports 17 adapted to rest on the upper edges of the combustion chamber 4. The supports 17 are inverted V shaped in cross section with the ridges of said supports merging into the walls of the member 15 and the slanting walls 18 of the supports adapted to shed any soot deposited thereon. The openings 16 are graduated in size starting at the outlet connection 13 and gradually increasing, in both directions to the opposite side of the dome 5, and it is in consequence of said openings that the supports 17 vary in length. This peculiar formation of the diffusible member places the marginal edge 19 of the member body in eccentric relation to the axis of the combustion chamber, and by reference to Fig. 2 it will be noted that one side of the member 15 restricts the upper ends of the flues 12 adjacent the side outlet connection 13, and the opposite edge of the member 15 leaves the flues 12 wide open. With the openings 16 properly graduated the draft in the flues 12 will be equalized with the result that the walls of all of the flues will be equally heated, with no "hot spot" or intense heating adjacent the side outlet flue 13. If all the openings 16 were equal in area or of the same size at the upper ends of the flues 12, the draft would be greater at the outlet side of the dome than at other sides causing the products of combustion to be drawn direct to the outlet connection 13 without providing uniform heating of the combustion walls. This is what I avoid by the novel configuration of the member 15, which is made of durable material and easily installed when the parts of the furnace are assembled. The furnace is simply an example of various types of heaters or combustion chambers in which my draft equalizer and diffuser may be used, therefore I do not care to limit my invention to the type of heater or any structural details other than defined by the appended claims.

What I claim is:—

1. The combination in a heater, a combustion chamber, a horizontally disposed draft member co-axially of said combustion chamber and supported on the upper edges of said combustion chamber, said draft member having a number of draft walled openings for the products of combustion to pass through from one side to the other side of the said draft member, said draft member having a closed top and the openings varying in size with some of the opening walls below the plane of the upper edges of said combustion chamber.

2. A diffusible member for a heating structure, said member comprising a structure having marginal openings of different sizes formed in part by member supports of different lengths.

3. A heating structure having a combustion chamber with a fluted cover provided with a side outlet connection, a draft equalizing member having marginal supports at the juncture of said cover and chamber and extending in proximity to the top of said cover, said draft equalizing member having openings between the supports thereof with said openings increasing in size from the outlet side of said cover to the opposite side thereof.

4. In a furnace having a substantially cylindrical combustion chamber with its walls formed to provide flues, and a diffusing member supported by the walls of said combustion chamber, said diffusing member being conical with its apex in the axis of said combustion chamber and its marginal edges in eccentric relation to the cylindrical formation of the combustion chamber.

5. A furnace having a substantial cylindrical combustion chamber, and a draft diffusing member in said combustion chamber with the edges of said diffusing member in eccentric relation to said combustion chamber so as to cooperate with said combustion chamber in forming exhaust openings which vary in size.

In testimony whereof I affix my signature.

HENRY C. MAUL.